(12) United States Patent
Lin

(10) Patent No.: US 8,157,258 B2
(45) Date of Patent: Apr. 17, 2012

(54) TORQUE LIMITING ROLLER AND MEDIUM SEPARATING MECHANISM USING THE SAME

(75) Inventor: Chia-Shin Lin, Hsinchu (TW)

(73) Assignee: Avision Inc. (TW)

(*) Notice: Subject to any disclaimer, the term of this patent is extended or adjusted under 35 U.S.C. 154(b) by 305 days.

(21) Appl. No.: 12/645,319

(22) Filed: Dec. 22, 2009

(65) Prior Publication Data
US 2010/0213665 A1 Aug. 26, 2010

(30) Foreign Application Priority Data
Feb. 23, 2009 (TW) ................................ 98105595 A

(51) Int. Cl.
*B65H 3/52* (2006.01)

(52) U.S. Cl. .................... 271/121; 271/124; 271/125

(58) Field of Classification Search .................. 271/121, 271/124, 125
See application file for complete search history.

(56) References Cited

U.S. PATENT DOCUMENTS

| | | | |
|---|---|---|---|
| 5,039,080 A * | 8/1991 | Kato et al. ................... | 271/122 |
| 5,651,542 A * | 7/1997 | Yamauchi et al. ............ | 271/122 |
| 5,860,645 A * | 1/1999 | Tomura et al. .............. | 271/10.13 |
| 7,344,133 B2 * | 3/2008 | Miki .............................. | 271/122 |
| 2008/0164651 A1 * | 7/2008 | Sheng et al. .................. | 271/121 |

FOREIGN PATENT DOCUMENTS

| TW | 200815208 | 4/2008 |
|---|---|---|
| TW | 200823071 | 6/2008 |
| TW | 200827167 | 7/2008 |
| TW | 200835642 | 9/2008 |

* cited by examiner

*Primary Examiner* — David H Bollinger

(57) ABSTRACT

A torque limiting roller includes a shaft, a frictional unit, a roller assembly, a fixing unit and an elastic unit. The shaft includes a first end and a second end. The frictional unit is mounted on the first end of the shaft. The roller assembly is rotatably mounted on the shaft and includes a first end and a second end. The first end of the roller assembly is in frictional contact with the frictional unit. The fixing unit is mounted on the second end of the shaft. The elastic unit is mounted on the shaft, disposed between the fixing unit and the roller assembly, and contacts with the second end of the roller assembly and the fixing unit to provide a normal force between the roller assembly and the frictional unit and thus to provide limiting torque. A medium separating mechanism using the torque limiting roller is also disclosed.

20 Claims, 5 Drawing Sheets

TORQUE LIMITING ROLLER AND MEDIUM SEPARATING MECHANISM USING THE SAME

This application claims priority of No. 098105595 filed in Taiwan R.O.C. on Feb. 23, 2009 under 35 USC 119, the entire content of which is hereby incorporated by reference.

BACKGROUND OF THE INVENTION

1. Field of the Invention

The invention relates to a torque limiting roller and a medium separating mechanism using the same, and more particularly to a bidirectional torque limiting roller and a medium separating mechanism using the same.

2. Related Art

A torque limiting roller can provide limiting torque. When the driving torque of a driving roller for driving the torque limiting roller is greater than the limiting torque of the torque limiting roller, the torque limiting roller can be rotated by the driving roller. When the driving torque of the driving roller for driving the torque limiting roller is smaller than the limiting torque of the torque limiting roller, the torque limiting roller cannot be rotated.

FIG. 8 is an exploded illustration showing a conventional torque limiting roller 100. Referring to FIG. 8, the conventional torque limiting roller 100 includes a coupler 110, a roller 120 and a torsional spring 130. The torsional spring 130 is disposed between the coupler 110 and the roller 120, and one end of the torsional spring 130 is mounted on the coupler 110 or the roller 120. When the roller 120 is rotated, the inner diameter of the torsional spring 130 is decreased or increased in different rotation directions. The torsional spring 130 with the increased inner diameter is in frictional contact with a shaft surface 112 of the coupler 110 and a shaft surface 122 of the roller 120 so that the limiting torque is provided. The torsional spring 130 with the decreased inner diameter cannot provide the limiting torque. Thus, the conventional torque limiting roller only can provide the unidirectional limiting torque, but cannot provide the bidirectional limiting torque. In addition, the control of the contact surface is more sensitive. If the dimensions have errors, the provided limiting torque is not perfect. Thus, the torsional spring 130 has to be made with precision, and the cost will be higher.

Thus, it is an important object of the invention to provide a low-cost torque limiting roller capable of providing the bidirectional limiting torque.

SUMMARY OF THE INVENTION

It is therefore an object of the invention to provide a torque limiting roller, which can provide the bidirectional limiting torque, is less sensitive to the dimensional error, and allows the user to adjust the limiting torque according to the condition of use.

To achieve the above-identified object, the invention provides a torque limiting roller including a shaft, a frictional unit, a roller assembly, a fixing unit and an elastic unit. The shaft includes a first end and a second end. The frictional unit is mounted on the first end of the shaft. The roller assembly is rotatably mounted on the shaft and includes a first end and a second end. The first end of the roller assembly is in frictional contact with the frictional unit. The fixing unit is mounted on the second end of the shaft. The elastic unit is mounted on the shaft, disposed between the fixing unit and the roller assembly, and contacts with the second end of the roller assembly and the fixing unit to provide a normal force between the roller assembly and the frictional unit and thus to provide limiting torque.

The invention also provides a medium separating mechanism including a feeding roller and a torque limiting roller. The feeding roller provides driving torque. The torque limiting roller is driven by the driving torque of the feeding roller and includes a shaft, a frictional unit, a roller assembly, a fixing unit and an elastic unit. The shaft includes a first end and a second end. The frictional unit is mounted on the first end of the shaft. The roller assembly is rotatably mounted on the shaft and includes a first end and a second end. The first end of the roller assembly is in frictional contact with the frictional unit. The fixing unit is mounted on the second end of the shaft. The elastic unit is mounted on the shaft, disposed between the fixing unit and the roller assembly, and contacts with the second end of the roller assembly and the fixing unit to provide a normal force between the frictional unit and the roller assembly and thus to provide limiting torque. A direction of the limiting torque is the same as a rotating direction of the driving torque, and a value of the limiting torque is smaller than a value of the driving torque so that media between the feeding roller and the torque limiting roller are separated to allow one of the media contacting with the feeding roller to be transported past the feeding roller and the torque limiting roller.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
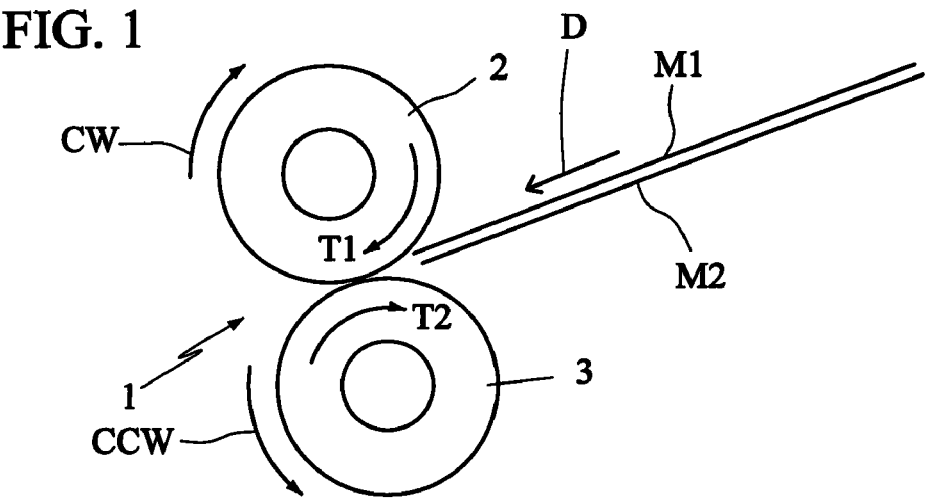
FIGS. 1 to 3 are schematic illustrations showing operations of a medium separating mechanism according to a preferred embodiment of the invention.
Figure 2:
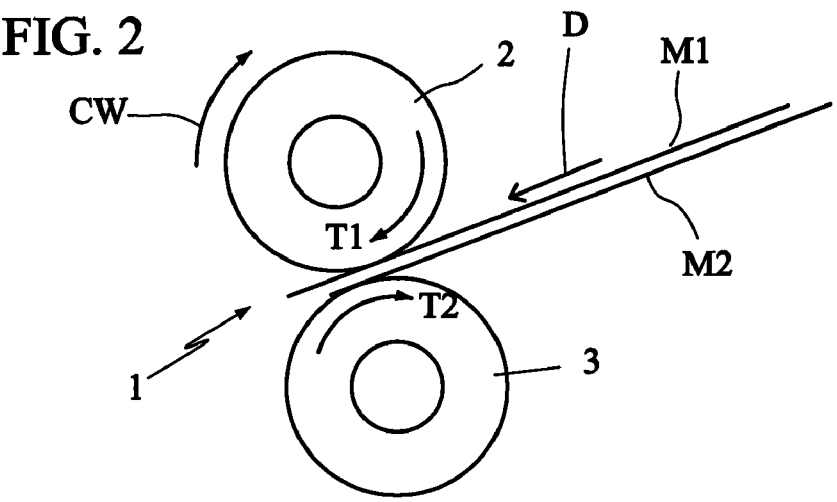
Figure 3:
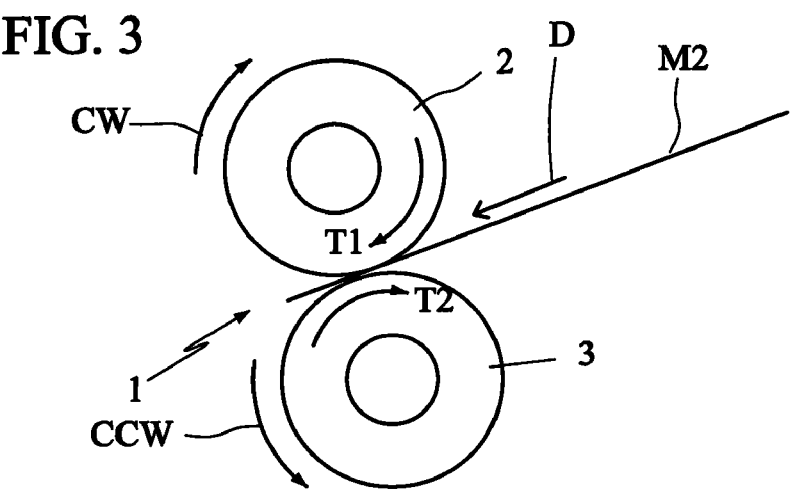

FIGS. 1 to 3 are schematic illustrations showing operations of a medium separating mechanism 1 according to a preferred embodiment of the invention. Referring to FIGS. 1 to 3, the medium separating mechanism 1 of this embodiment includes a feeding roller 2 and a torque limiting roller 3. The feeding roller 2 provides driving torque T1. The torque limiting roller 3 is not driven by a motor, but may be rotated by the driving torque T1 of the feeding roller 2. The torque limiting roller 3 provides limiting torque T2. The direction of the limiting torque T2 is the same as the direction of the driving torque T1, and the value of the limiting torque T2 is smaller than the value of the driving torque T1 so that media M1 and M2 between the feeding roller 2 and the torque limiting roller 3 may be separated to allow one of the media M1 and M2 contacting with the feeding roller 2 to be transported past the feeding roller 2 and the torque limiting roller 3. The media may include documents, sheets, slides or the like. In the example of this invention, the media are sheets.

More specifically, the driving torque T1 and the limiting torque T2 rotate in the clockwise direction. When the medium has not entered the part of the passageway between the feeding roller 2 and the torque limiting roller 3, as shown in FIG. 1, the torque T1 of the feeding roller 2 is greater than the torque T2 of the torque limiting roller 3. At this time, the torque limiting roller 3 is affected by the torque T1 of the feeding roller 2 rotating in the clockwise direction CW and thus rotated in the counterclockwise direction CCW. When the two media M1 and M2 simultaneously enter the part of the passageway between the torque limiting roller 3 and the feeding roller 2, the status is shown in FIG. 2. At this time, the driving torque T1 of the feeding roller 2 drives the medium M1 to move in the feeding direction D, and the limiting torque T2 of the torque limiting roller 3 restricts the movement of the medium M2. Because the friction between the torque limiting roller 3 and the medium M2 is greater than the friction between the media M1 and M2, the medium M2 stays between the torque limiting roller 3 and the feeding roller 2, while the medium M1 is transported past the feeding roller 2 and the torque limiting roller 3. As shown in FIG. 3, when the last medium M2 is being transported, the driving torque T1 of the feeding roller 2 drives the medium M2 to move in the feeding direction D. Because the driving torque T1 is greater than the limiting torque T2, the driving torque T1 drives the medium M2, and the medium M2 further drives the torque limiting roller 3 to rotate in the counterclockwise direction CCW.

Figure 4:
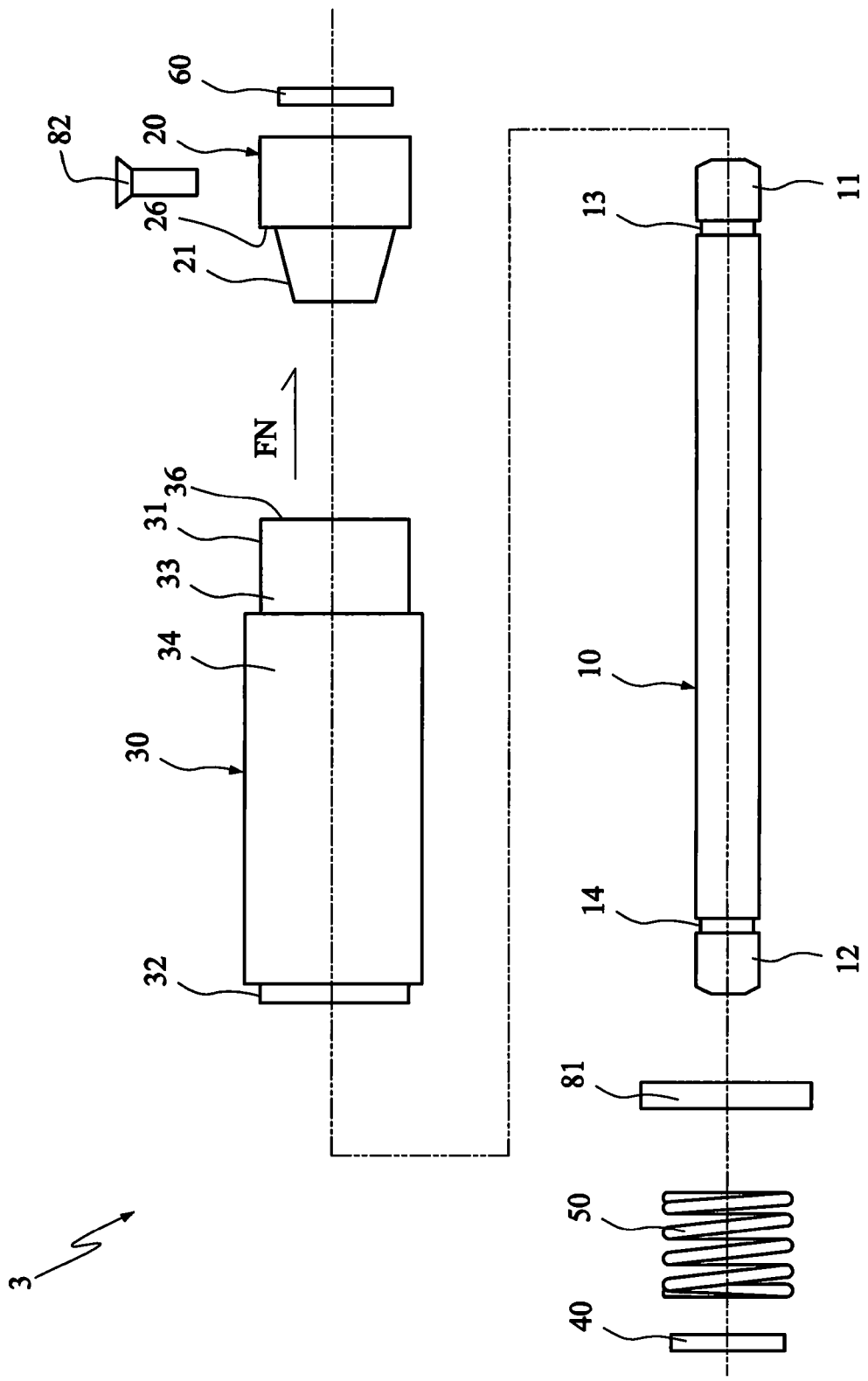
FIG. 4 is an exploded illustration showing a torque limiting roller according to a first embodiment of the invention.
Figure 5:
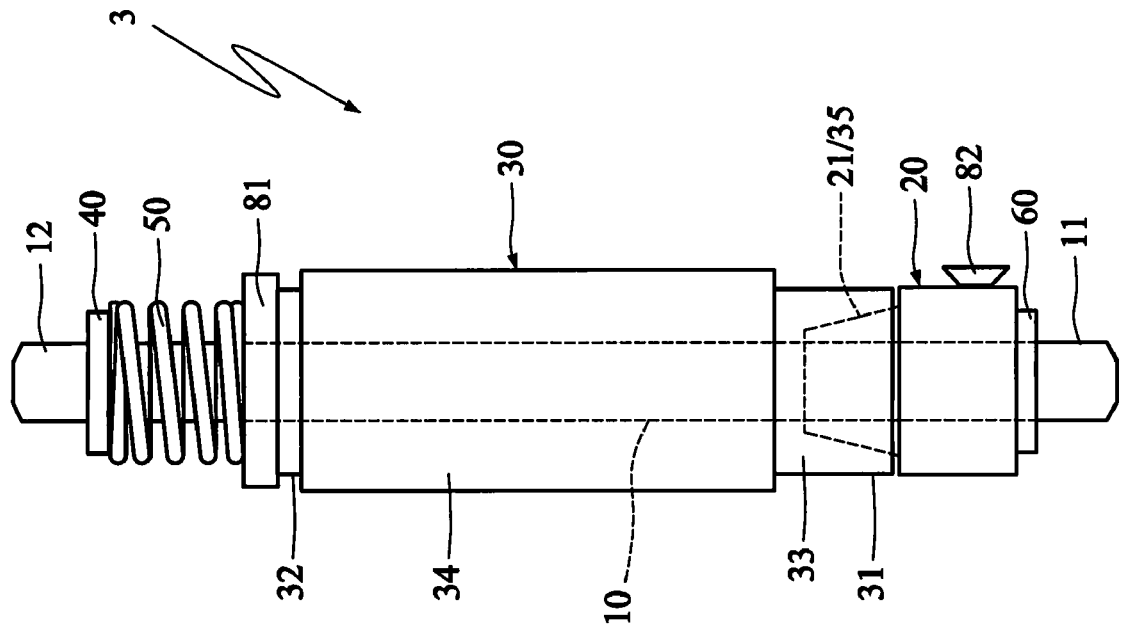
FIG. 5 is an assembled illustration showing the torque limiting roller according to the first embodiment of the invention.

FIG. 4 is an exploded illustration showing the torque limiting roller 3 according to a first embodiment of the invention. FIG. 5 is an assembled illustration showing the torque limiting roller 3 according to the first embodiment of the invention. Referring to FIGS. 4 and 5, the torque limiting roller 3 includes a shaft 10, a frictional member or frictional unit 20, a roller assembly 30, a fixing member or fixing unit 40 and an elastic member or elastic unit 50.

The shaft 10 includes a first end 11 and a second end 12. The first end 11 of the shaft 10 is formed with a first groove 13, and the second end 12 of the shaft 10 is formed with a second groove 14.

The frictional unit 20 is mounted on the first end 11 of the shaft 10. For example, a set screw 82 is provided to mount the frictional unit 20 on the first end 11 of the shaft 10.

The frictional unit 20 includes a first conical surface 21 to be in frictional contact with the roller assembly 30. The roller assembly 30 may include a second conical surface 35 to be in frictional contact with the first conical surface 21. In this embodiment, the first conical surface 21 is an external conical surface, and the second conical surface 35 is an internal conical surface. The contact between the two conical surfaces can provide the stable friction force and thus the stable limiting torque. However, the limiting torque T2 may also be generated by the friction force between an end surface 36 of the roller assembly 30 and an end surface 26 of the frictional unit 20.

The roller assembly 30 is rotatably mounted on the shaft 10 and includes a first end 31 and a second end 32. The first end 31 of the roller assembly 30 is in frictional contact with the frictional unit 20. In this embodiment, the roller assembly 30 includes a first hollow cylinder 33 and a second hollow cylinder 34. The first hollow cylinder 33 is disposed around the shaft 10. The second hollow cylinder 34 is disposed around and fixed on the first hollow cylinder 33. The material of the second hollow cylinder 34 includes rubber, and the material of the first hollow cylinder 33 includes metal.

The fixing unit 40 is mounted on the second end 12 of the shaft 10. The fixing unit 40 may be implemented as a ring, a nut or the like.

The elastic unit 50 is mounted on the shaft 10 and disposed between the fixing unit 40 and the roller assembly 30, and contacts with the second end 32 of the roller assembly 30 and the fixing unit 40 to provide a normal force FN between the roller assembly 30 and the frictional unit 20 and thus to provide the limiting torque T2. The elastic unit 50 may be a spring, which may be in direct contact with the second end 32 of the roller assembly 30, or in indirect contact with the second end 32 of the roller assembly 30 through a washer 81 so that the attrition, caused by the spring, on the second end 32 may be reduced, and the spring can provide the uniform pressure to the second end 32.

In addition, the torque limiting roller 3 may further include a first ring 60, and the fixing unit 40 includes a second ring. The first ring 60 is fitted in the first groove 13 and contacts with the frictional unit 20. The second ring is fitted in the second groove 14 and contacts with the elastic unit 50. The ring may be a C-ring or an E-ring.

Figure 6:
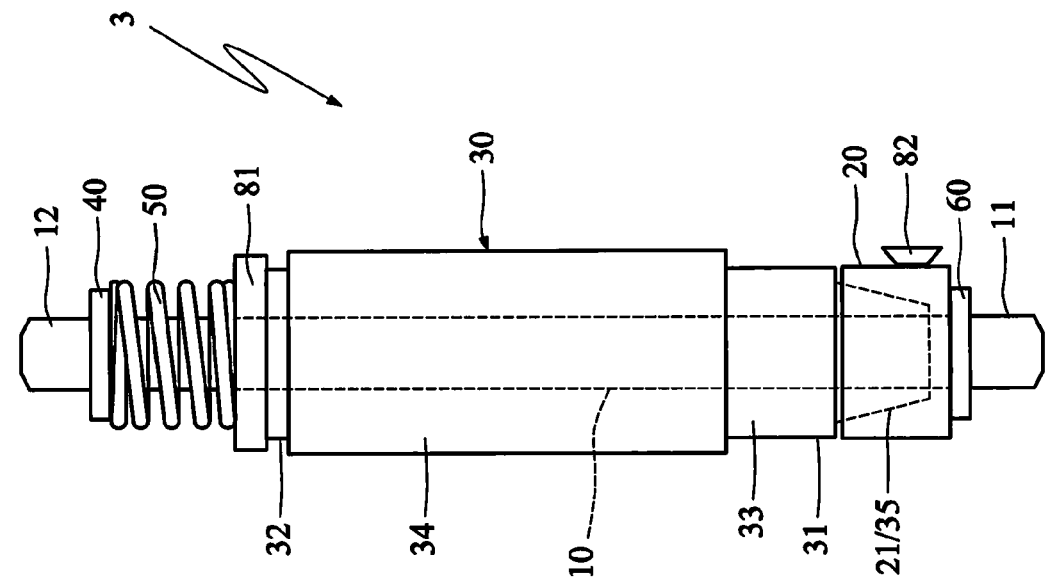
FIG. 6 is an assembled illustration showing a torque limiting roller according to a second embodiment of the invention.

FIG. 6 is an assembled illustration showing a torque limiting roller according to a second embodiment of the invention. As shown in FIG. 6, this embodiment is similar to the first embodiment except that the second end 12 of the shaft 10 includes a second threaded portion Tr2, and the fixing unit 40 is a second nut fitted with the second threaded portion Tr2 so that the limiting torque T2 is adjustable. That is, when the second nut 40 is tightened in the direction to the frictional unit 20, the limiting torque T2 is increased. On the contrary, when the second nut 40 is loosened in the direction opposite the frictional unit 20, the limiting torque T2 is reduced. In addition, the first end 11 of the shaft 10 includes a first threaded portion Tr1, and the torque limiting roller 3 further includes a first nut 70 fitted with the first threaded portion Tr1 so that the limiting torque T2 is adjustable. In this case, the user can firstly loosen the set screw 82, and then tighten the set screw 82 after the limiting torque has been adjusted.

Figure 7:
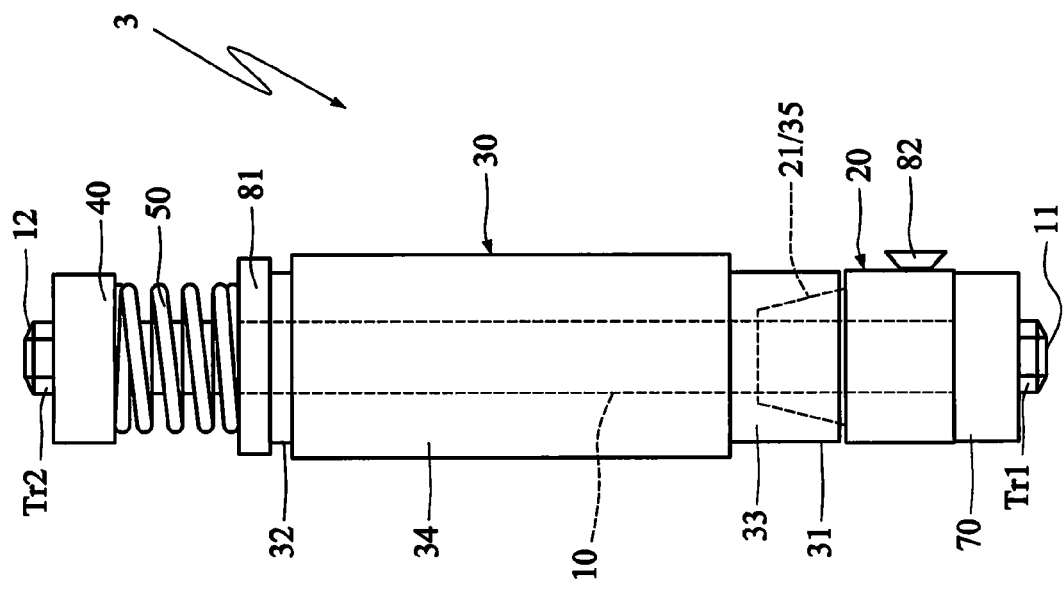
FIG. 7 is an assembled illustration showing a torque limiting roller according to a third embodiment of the invention.
Figure 8:
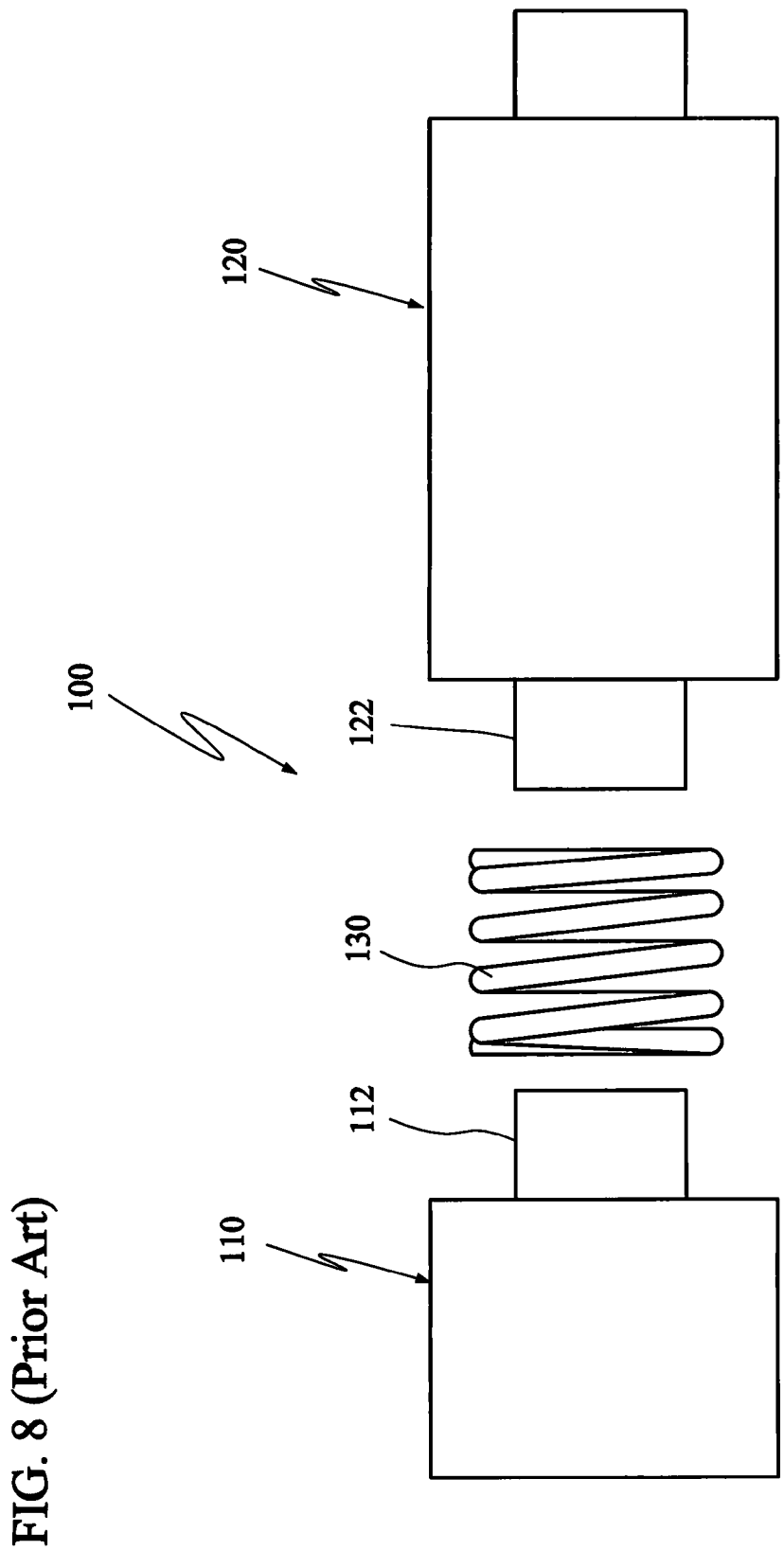
FIG. 8 is an exploded illustration showing a conventional torque limiting roller.

FIG. 7 is an assembled illustration showing a torque limiting roller according to a third embodiment of the invention. As shown in FIG. 7, this embodiment is similar to the first embodiment except that the first conical surface 21 includes an internal conical surface, and the second conical surface 35 includes an external conical surface.

Thus, the torque limiting roller of the invention can generate the stable and proper limiting torque according to the friction between two fixed surfaces. Because the tolerance requirements on the two fixed surfaces are low, the cost can be effectively reduced. In addition, the torque limiting roller can provide the stable and proper limiting torque in either the clockwise direction or the counterclockwise direction so that the torque limiting roller can be widely applied. Thus, when the torque limiting roller of the invention is applied to the medium separating mechanism in an apparatus, such as a scanner, a printer, a multi-function peripheral, a fax machine or a copier, the stable separating function can be provided and the cost can be effectively reduced.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A torque limiting roller, comprising:
a shaft comprising a first end and a second end;
a frictional unit mounted on the first end of the shaft;
a roller assembly rotatably mounted on the shaft and comprising a first end and a second end, wherein the first end of the roller assembly is in frictional contact with the frictional unit;
a fixing unit mounted on the second end of the shaft; and
an elastic unit mounted on the shaft, disposed between the fixing unit and the roller assembly, and contacting with the second end of the roller assembly and the fixing unit to provide a normal force between the roller assembly and the frictional unit and thus to provide limiting torque.

2. The torque limiting roller according to claim 1, wherein the frictional unit comprises a first conical surface to be in frictional contact with the roller assembly.

3. The torque limiting roller according to claim 2, wherein the roller assembly comprises a second conical surface to be in frictional contact with the first conical surface.

4. The torque limiting roller according to claim 3, wherein the first conical surface is an external conical surface, and the second conical surface is an internal conical surface.

5. The torque limiting roller according to claim 3, wherein the first conical surface is an internal conical surface, and the second conical surface is an external conical surface.

6. The torque limiting roller according to claim 1, wherein the first end of the shaft is formed with a first groove, and the second end of the shaft is formed with a second groove.

7. The torque limiting roller according to claim 6, wherein the torque limiting roller further comprises a first ring, the fixing unit comprises a second ring, the first ring is fitted in the first groove and contacts with the frictional unit, and the second ring is fitted in the second groove and contacts with the elastic unit.

8. The torque limiting roller according to claim 1, wherein the second end of the shaft comprises a second threaded portion, and the fixing unit comprises a second nut fitted with the second threaded portion such that the limiting torque is adjustable.

9. The torque limiting roller according to claim 1, wherein the first end of the shaft comprises a first threaded portion, and the torque limiting roller further comprises a first nut fitted with the first threaded portion such that the limiting torque is adjustable.

10. The torque limiting roller according to claim 1, wherein the roller assembly comprises a first hollow cylinder and a second hollow cylinder, the first hollow cylinder is disposed around the shaft, and the second hollow cylinder is disposed around and fixed on the first hollow cylinder.

11. A medium separating mechanism, comprising:
a feeding roller for providing driving torque; and
a torque limiting roller driven by the driving torque of the feeding roller, the torque limiting roller comprising:
a shaft comprising a first end and a second end;
a frictional unit mounted on the first end of the shaft;
a roller assembly rotatably mounted on the shaft and comprising a first end and a second end, wherein the first end of the roller assembly is in frictional contact with the frictional unit;
a fixing unit mounted on the second end of the shaft; and
an elastic unit mounted on the shaft, disposed between the fixing unit and the roller assembly, and contacting with the second end of the roller assembly and the fixing unit to provide a normal force between the frictional unit and the roller assembly and thus to provide limiting torque, wherein:
a direction of the limiting torque is the same as a rotating direction of the driving torque, and a value of the limiting torque is smaller than a value of the driving torque so that media between the feeding roller and the torque limiting roller are separated to allow one of the media contacting with the feeding roller to be transported past the feeding roller and the torque limiting roller.

12. The medium separating mechanism according to claim 11, wherein the frictional unit comprises a first conical surface to be in frictional contact with the roller assembly.

13. The medium separating mechanism according to claim 12, wherein the roller assembly comprises a second conical surface to be in frictional contact with the first conical surface.

14. The medium separating mechanism according to claim 13, wherein the first conical surface is an external conical surface, and the second conical surface is an internal conical surface.

15. The medium separating mechanism according to claim 13, wherein the first conical surface is an internal conical surface, and the second conical surface is an external conical surface.

16. The medium separating mechanism according to claim 11, wherein the first end of the shaft is formed with a first groove, and the second end of the shaft is formed with a second groove.

17. The medium separating mechanism according to claim 16, wherein the torque limiting roller further comprises a first ring, the fixing unit comprises a second ring, the first ring is fitted in the first groove and contacts with the frictional unit, and the second ring is fitted in the second groove and contacts with the elastic unit.

18. The medium separating mechanism according to claim 11, wherein the second end of the shaft comprises a second threaded portion, and the fixing unit comprises a second nut fitted with the second threaded portion such that the limiting torque is adjustable.

19. The medium separating mechanism according to claim 11, wherein the first end of the shaft comprises a first threaded portion, and the torque limiting roller further comprises a first nut fitted with the first threaded portion such that the limiting torque is adjustable.

20. The medium separating mechanism according to claim 11, wherein the roller assembly comprises a first hollow cylinder and a second hollow cylinder, the first hollow cylinder is disposed around the shaft, and the second hollow cylinder is disposed around and fixed on the first hollow cylinder.

* * * * *